US007295194B2

(12) United States Patent
Lee

(10) Patent No.: US 7,295,194 B2
(45) Date of Patent: Nov. 13, 2007

(54) APPARATUS AND METHOD FOR OUTPUTTING DIFFERENT DISPLAY IDENTIFICATION DATA DEPENDING ON TYPE OF CONNECTOR

(75) Inventor: Kyung-shik Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 640 days.

(21) Appl. No.: 10/680,420

(22) Filed: Oct. 8, 2003

(65) Prior Publication Data

US 2004/0119731 A1 Jun. 24, 2004

(30) Foreign Application Priority Data

Oct. 8, 2002 (KR) ...................... 10-2002-0061221

(51) Int. Cl.
*G06F 3/038* (2006.01)
*G09G 5/00* (2006.01)

(52) U.S. Cl. ........................................ 345/204; 345/3.1

(58) Field of Classification Search ................. 345/3.1, 345/87, 501, 519, 520, 204; 710/14, 16, 710/122

See application file for complete search history.

(56) References Cited

U.S. PATENT DOCUMENTS 6,943,753 B2 * 9/2005 Shirasaki et al. ............ 345/3.1

FOREIGN PATENT DOCUMENTS

| | | |
|---|---|---|
| KR | 1998-79236 | 11/1998 |
| KR | 2002-38292 | 5/2002 |

OTHER PUBLICATIONS http://en.wikipedia.org/wiki/EDID.*
Korean Office Action dated Sep. 24, 2004.

* cited by examiner

*Primary Examiner*—Kevin M. Nguyen
(74) *Attorney, Agent, or Firm*—Staas & Halsey LLP

(57) ABSTRACT

An apparatus and a method output different display identification data to a system depending on a connector type. The apparatus to output different display identification data depending on a connector type includes an analog display identification data storing and outputting unit; a digital display identification data storing and outputting unit; a connector type identification unit which identifies the connector type based upon the output of pins of a predetermined connector; and a display identification data output command unit which commands the analog display identification data storing and outputting unit or the digital display identification data storing and outputting unit to output the analog display identification data or the digital display identification data to the system based upon the identified connector type.

33 Claims, 8 Drawing Sheets

FIG. 6

| | DVI-D | DVI-I | DVI-A | | DVI-D | DVI-I | DVI-A | | DVI-D | DVI-I | DVI-A | | DVI-D | DVI-I | DVI-A |
|---|---|---|---|---|---|---|---|---|---|---|---|---|---|---|---|
| 1 | TMDS Data 2- | | N.C | 9 | TMDS Data 1- | | N.C | 17 | TMDS Data 0- | | N.C | C1 | N.C | Analog Red | |
| 2 | TMDS Data 2+ | | N.C | 10 | TMDS Data 1+ | | N.C | 18 | TMDS Data 0+ | | N.C | C2 | N.C | Analog Green | |
| 3 | TMDS Data 2/4 Ground | | N.C | 11 | TMDS Data 1/3 Ground | | N.C | 19 | TMDS Data 0/5 Ground | | N.C | C3 | N.C | Analog Blue | |
| 4 | TMDS Data 4- | | N.C | 12 | TMDS Data 3- | | N.C | 20 | TMDS Data 5- | | N.C | C4 | N.C | Analog H Sync | |
| 5 | TMDS Data 4+ | | N.C | 13 | TMDS Data 3+ | | N.C | 21 | TMDS Data 5+ | | N.C | C5 | N.C | Analog Ground | |
| 6 | DDC Clock | | | 14 | +5V Power | | | 22 | TMDS Clock Ground | | N.C | | | | |
| 7 | DDC Data | | | 15 | Ground (+5,H/V Sync) | | | 23 | TMDS Clock+ | | N.C | | | | |
| 8 | N.C | Analog V Sync | | 16 | Hot Plug Detect | | | 24 | TMDS Clock- | | N.C | | | | |

FIG. 7

| DVI MANNERS | 22nd PIN | C5-th | INPUT OF A (MCU) | INPUT OF B (MCU) | OUTPUT OF C (MCU) | CIRCUIT OPERATIONS |
|---|---|---|---|---|---|---|
| DVI-D TYPE | GROUND | HIGH IMPEDANCE | LOW | HIGH | HIGH | IC2 ON, IC3 OFF, CONNECTED TO IC4 |
| DVI-A TYPE | HIGH IMPEDANCE | GROUND | HIGH | LOW | LOW | IC2 OFF, IC3 ON, CONNECTED TO IC5 |
| DVI-I TYPE | GROUND | GROUND | LOW | LOW | HIGH/LOW 선택 가능 | IC4 OR IC5 SELECTED |

APPARATUS AND METHOD FOR OUTPUTTING DIFFERENT DISPLAY IDENTIFICATION DATA DEPENDING ON TYPE OF CONNECTOR

CROSS-REFERENCE TO RELATED APPLICATIONS

This application claims the priority of Korean Patent Application No. 2002-61221, filed on Oct. 8, 2002, in the Korean Intellectual Property Office, the disclosure of which is incorporated herein in its entirety by reference.

BACKGROUND OF THE INVENTION

1. Field of the Invention

The present invention relates to an apparatus and a method to provide different pieces of display identification data to a system depending on a connector type.

2. Description of the Related Art

Since a digital visual interface (DVI) was set up as a global standard by the Digital Display Working Group (DDWG), the DVI has been widely adopted in a variety of display devices. However, conventional techniques have failed to transmit extended display identification data (EDID) according to specifications suggested by the Video Electronics Standards Association (VESA), i.e., EDID appropriate for three different DVI input manners, i.e., three different connector types (DVI-I-type, DVI-D-type, and DVI-I-type), due to a unified EDID transmission method in which a connector type is completely ignored.

FIG. 1 is a block diagram of a conventional apparatus to output display identification data. The conventional apparatus includes a DVI connector 11 for a system, a digital visual interface (DVI) connector 12 for an output device, and an electrically erasable programmable read-only memory (EEPROM) 13.

When power is applied to the system, the system supplies power to the EEPROM 13 near the display device via a fourteenth pin of each of the DVI connectors 11 and 12 and reads EDID necessary to identify the display device from the EEPROM 13 via sixth and seventh pins of each of the DVI connectors 11 and 12. By doing so, the system receives data of the display device, such as optimum resolution and color information of a monitor, and sets up an optimum environment for the display device, i.e., the monitor. In the related art, a user has to manually set up such an optimum environment for the monitor. However, a plug-and-play (PNP) function, by which a system may be automatically set up via a display data channel (DDC), has replaced such a manual setting.

In the meantime, while there are three different types of DVI connectors, i.e., a DVI-A-type connector, a DVI-D-type connector, and a DVI-I-type connector, the EDID may only be transmitted via the sixth (DDC clock) and seventh (DDC data) pins of each of the DVI connectors 11 and 12. Therefore, it is impossible to transmit EDID appropriate for different types of DVI connectors. In other words, supposing that the system and the display device are connected via a DVI-D-type connector, digital EDID should be transmitted from the EEPROM 13 to the system. Supposing that the system and the display device are connected via a DVI-A-type connector, analog EDID should be transmitted from the EEPROM 13 to the system. Supposing that the system and the display device are connected via a DVI-I-type connector, any desired one of digital EDID and analog EDID should be transmitted from the EEPROM 13 to the system. However, as described above, in the related art, either digital EDID or analog EDID may be transmitted from the EEPROM 13 to the system because only the sixth and seventh pins of each of the DVI connectors 11 and 12 are set up as DDC signal transmission lines. Therefore, in the related art, irrespective of the type of a DVI connector, in other words, irrespective of the type of display device, either digital EDID or analog EDID may be transmitted. Here, a DVI connector type depends on a display device type.

FIG. 2 is a block diagram of another conventional apparatus to output display identification data. Referring to FIG. 2, the conventional apparatus includes a digital/analog video input/output unit 25, a first memory unit 21, a second memory unit 22, a switching unit 23, and a micom 24.

The digital/analog video input/output unit 25 receives a digital or analog image signal from a personal computer (PC) 26 and outputs display data corresponding to the received signal to the PC 26. The first and second memory units 21 and 22 store analog display data and digital display data, respectively. The switching unit 23 connects either the first or the second memory unit 21 or 22 to the digital/analog video input/output unit 25. The micom 24 determines the image format of the PC 26 according to a selection signal input by a user or a synchronization signal output from the PC 26 and controls the switching unit 23 so that display data corresponding to the image format of the PC 26 may be output to the PC 26. In short, the conventional apparatus to output display identification data of FIG. 2 identifies the image format (analog/digital) of the PC 26 based on the selection signal or the synchronization signal and makes the display data corresponding to the identified image format to the PC 26.

Even though the conventional apparatus to output the display identification data of FIG. 2 has some remarkable improvements, as compared to the conventional apparatus to output the display identification data of FIG. 1, it still has some serious problems, too. In other words, in the related art, only a DVI-I-type connector is taken into account, while the fact that DVI-A-type connectors DVI-D-type connectors are being manufactured and are being widely used is completely ignored. Therefore, the conventional apparatuses to output the display identification data have failed to provide display identification data appropriate for a system and a display device implemented with a DVI-A-type connector or a DVI-D-type connector.

SUMMARY OF THE INVENTION

The present invention provides an apparatus and a method to transmit precise display identification data to a system based upon an identified type of connector.

According to an aspect of the present invention, an apparatus outputs different display identification data depending on a connector type. The apparatus includes: an analog display identification data storing and outputting unit which stores predetermined analog display identification data and outputs the stored analog display identification data to a predetermined system when a command to output the analog display identification data is issued; a digital display identification data storing and outputting unit which stores predetermined digital display identification data and outputs the stored digital display identification data to the system when a command to output the analog display identification data is issued; a connector type identification unit which identifies the connector type based upon the output of pins of a predetermined connector; and a display identification data output command unit which commands the analog display identification data storing and outputting unit or the digital display identification data storing and outputting unit to output the analog display identification data or the digital display identification data to the system based upon the identified connector type.

According to another aspect of the present invention, a method outputs different display identification data depending on a connector type. The method includes:(storing predetermined analog display identification data; storing predetermined digital display identification data; identifying the connector type based upon the output of pins of a predetermined connector; issuing a command to output the analog display identification data or the digital display identification data depending on the identified connector type; outputting the analog display identification data in response to the command to output the stored analog display identification data; and outputting the digital display identification data in response to the command to output the stored digital display identification data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

The above and/or other features and advantages of the present invention will become more apparent by describing in detail exemplary embodiments thereof with reference to the attached drawings in which:

FIG. 6 is a diagram illustrating the arrangement of signals for different DVI-I-type connectors;

FIG. 7 is a logic calculation table to identify a DVI connector type;

DETAILED DESCRIPTION OF THE EMBODIMENTS

Figure 1:
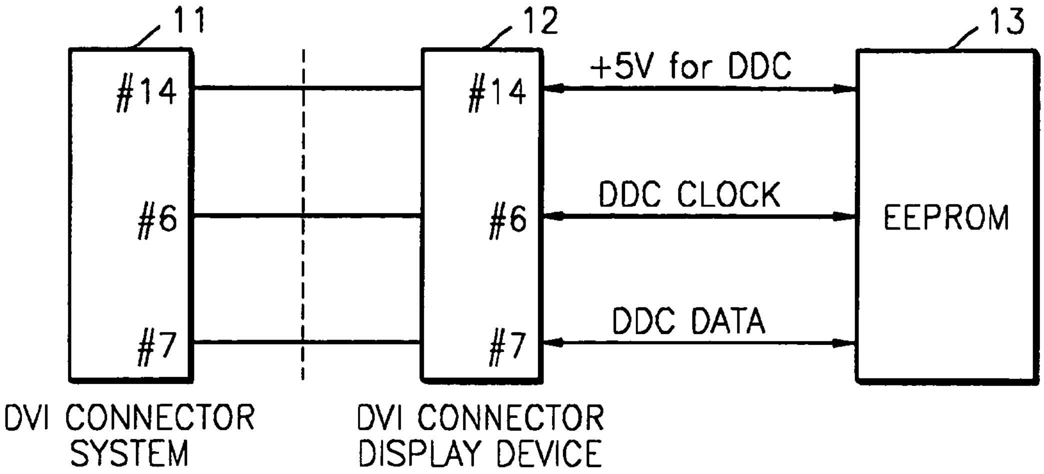
FIG. 1 (PRIOR ART)
FIG. 1 is a block diagram of a conventional apparatus to output display identification data.
Figure 2:
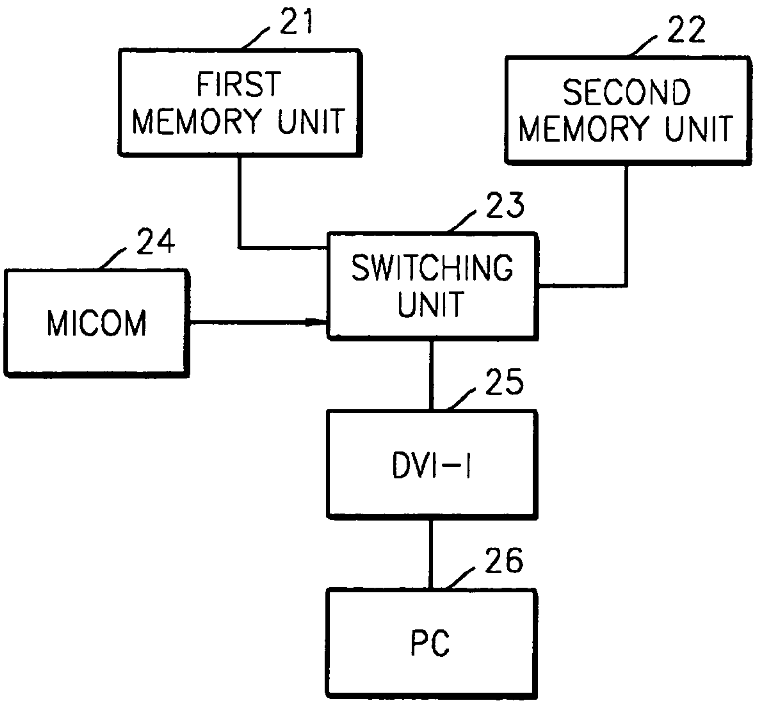
FIG. 2 (PRIOR ART)
FIG. 2 is a block diagram of another conventional apparatus to output display identification data.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will be described more fully with reference to the accompanying drawings in which selected embodiments of the invention are shown.

Figure 3:
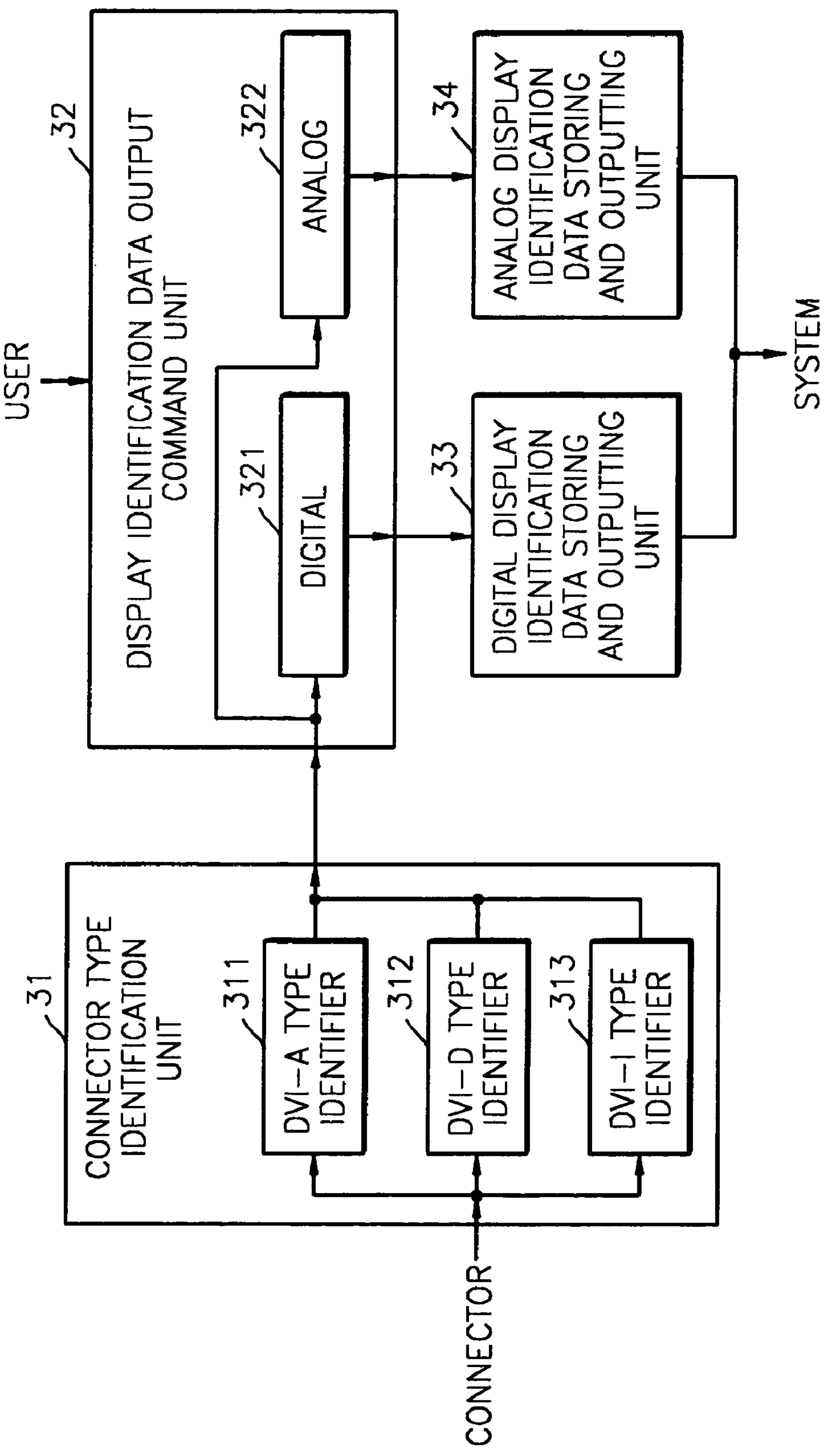
FIG. 3 is a block diagram of an apparatus to output different display identification data depending on a connector type according to an embodiment of the present invention.

FIG. 3 is a block diagram of an apparatus to output different display identification data depending on a connector type according to an embodiment of the present invention. The apparatus includes an analog display identification data storing and outputting unit 34, a digital display identification data storing and outputting unit 33, a connector type identification unit 31, and a display identification data output command unit 32.

The analog display identification data storing and outputting unit 34 stores analog display identification data and outputs the analog display identification data to a system when a command to output the analog display identification data is issued. The analog display identification data has a predetermined data structure according to extended display identification data (EDID) specifications suggested by the Video Electronics Standards Association (VESA). The system may be a personal computer that provides image data. The analog display identification data is transmitted via a display data channel (DDC). The DDC also follows standards defined by the VESA so that it may transmit data between a graphic card of a PC and a monitor. When the analog display identification data is transmitted to a PC via the DDC, for example, when a horizontal or vertical frequency, which comprises analog display identification data, is transmitted to a PC during the system booting of a video graphics array board of the PC, the PC sets up an optimum monitor environment based upon the transmitted analog display identification data.

The digital display identification data storing and outputting unit 33 stores digital display identification data and outputs the digital display identification data to the system when a command to output the digital display identification data is issued. The digital display identification data, as is the case with the analog display identification data, has a predetermined data structure according to the EDID specifications suggested by the VESA and is also transmitted to a PC via a DDC.

The connector type identification unit 31 identifies a connector type based upon the output of pins of the connector. Here, in general, the connector is a DVI connector. In other words, the connector type identification unit 31 verifies, based upon the output of the pins of the connector, whether the connector is a DVI-A-type connector, a DVI-D-type connector, or a DVI-I-type connector.

More specifically, when the output of a 22nd pin (Terminal Display Management System clock ground, i.e., TDMS clock ground) of a DVI connector is at a high impedance level and the output of a C5-th pin (analog ground) of the DVI connector is at a ground level, the connector type identification unit 31 identifies the DVI connector as a DVI-A-type connector. When the output of the 22nd pin (TDMS clock ground) of the DVI connector is at a ground level and the output of the C5-th pin (analog ground) of the DVI connector is at a high impedance level, the connector type identification unit 31 identifies the DVI connector as a DVI-D-type connector. When the output of the 22nd pin (TDMS clock ground) of the DVI connector is at a ground level and the output of the C5-th pin (analog ground) of the DVI connector is also at a ground level, the connector type identification unit 31 identifies the DVI connector as a DVI-I-type connector.

Depending on the type of the DVI connector, the display identification data output command unit 32 commands the analog display identification data storing and outputting unit 34 or the digital display identification data storing and outputting unit 33 to output the analog display identification data or the digital display identification data to the system. In particular, the display identification data output command unit 32 commands the analog display identification data storing and outputting unit 34 to output the analog display identification data when the DVI connector turns out to be a DVI-A-type connector.

When the connector type identification unit 31 identifies the DVI connector as a DVI-D-type connector, the display identification data output command unit 32 commands the digital display identification data storing and outputting unit 33 to output the digital display identification data. When the connector type identification unit 31 identifies the DVI connector as a DVI-I-type connector, the display identification data output command unit 32 commands according to predetermined additional information that the analog display identification data storing and outputting unit 34 output the analog display identification data. Here, the predetermined additional information indicates that the analog display identification data is to be output according to a user's selection. In other words, when the user selects his or her monitor to operate in an analog manner using an on-screen-display, the analog display identification data is output to the system via a DDC.

When the connector type identification unit 31 identifies the DVI connector as a DVI-I-type connector, the display identification data output command unit 32 commands, according to predetermined additional information, that the digital display identification data storing and outputting unit 33 output the digital display identification data. The predetermined additional information indicates that the digital display identification data is to be output according to a user's selection. In other words, when the user selects his or her monitor to operate in an digital manner using an on-screen-display, the digital display identification data is output to the system via a DDC.

Figure 4:
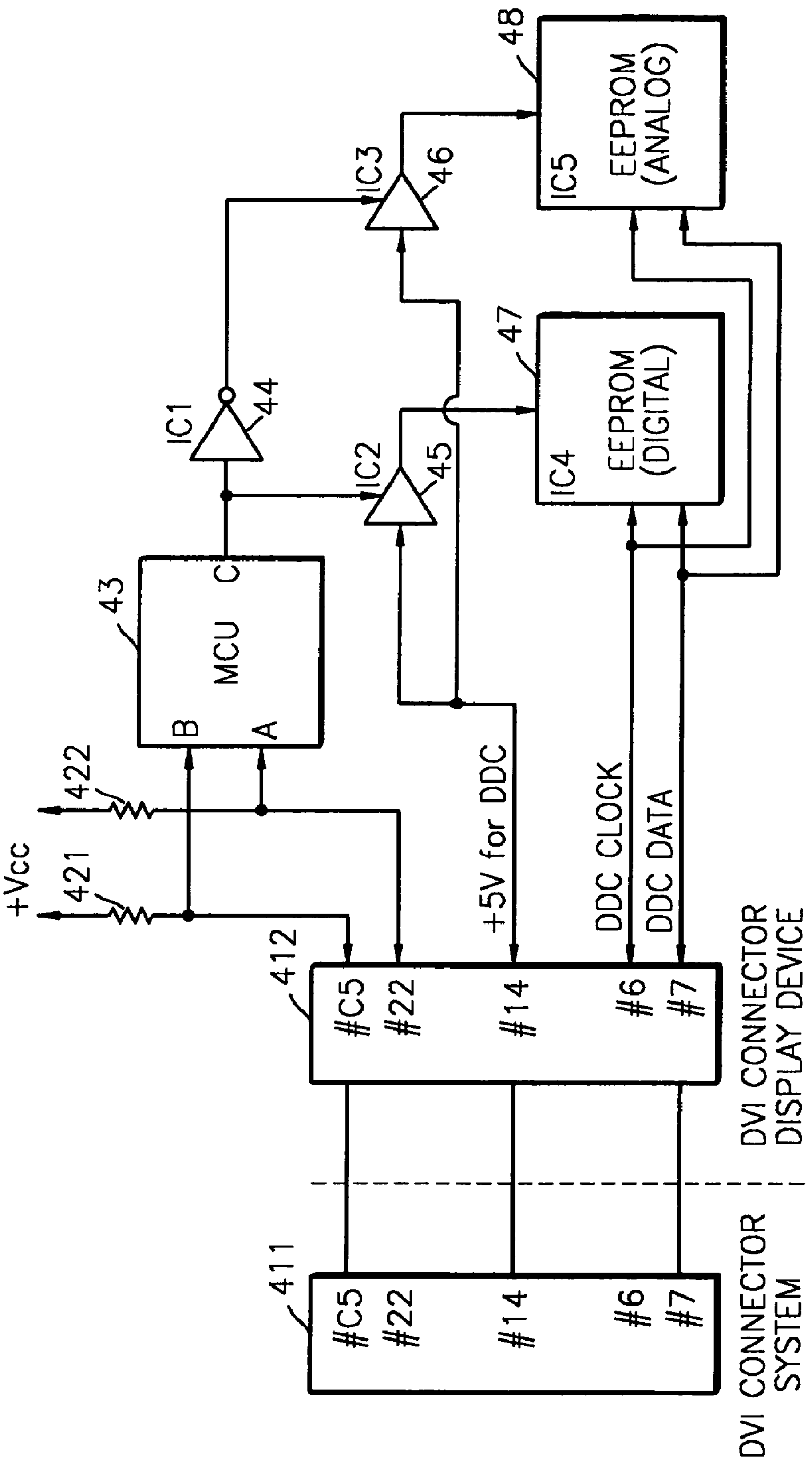
FIG. 4 is a block diagram of an apparatus to output different display identification data depending on a connector type according to another embodiment of the present invention.

FIG. 4 is a block diagram of an apparatus to output different display identification data depending on a connector type according to another embodiment of the present invention. Referring to FIG. 4, the apparatus includes a DVI connector 411 for a system, a DVI connector 412 for a display device (e.g., a monitor), pull-up resistors 421 and 422, a microcontroller unit 43, a NOT gate 44, buffers 45 and 46, and EEPROMs 47 and 48.

When the DVI connector 411 is connected to the DVI connector 412, the type of the DVI connectors 411 and 412 may be identified based upon whether 22nd and C5-th pins of the DVI connector 412 are grounded. In other words, when the output of the 22nd pin (TDMS clock ground) of the DVI connector 412 is at a high impedance level and the output of the C5-th pin (analog ground) of the DVI connector 412 is at a ground level, the DVI connector 412 is identified as a DVI-A-type connector. When the output of the 22nd pin (TDMS clock ground) of the DVI connector 412 is at a ground level and the output of the C5-th pin (analog ground) of the DVI connector 412 is at a high impedance level, the DVI connector 412 is identified as a DVI-D-type connector. When the output of the 22nd pin (TDMS clock ground) of the DVI connector 412 is at a ground level and the output of the C5-th pin (analog ground) of the DVI connector 412 is also at a ground level, the DVI connector 412 is identified as a DVI-I-type connector.

The pull-up resistors 421 and 422 prevent noise or malfunction when the 22nd and C5-th pins of the DVI connector 412 are at high impedance, i.e., when there is no output from the 22nd and C5-th pins of the DVI connector 412. When there is no output from the 22nd pin of the DVI connector 41, a high voltage +Vcc is applied to a port A of the MCU 43. When there is no output from the C5-th pin of the DVI connector 412, the high voltage +Vcc is applied to a port B of the MCU 43. When the output of the 22nd pin of the DVI connector 412 is at a ground level, a low voltage +0 V is applied to the port A of the MCU 43. When the output of the C5-th pin of the DVI connector 412 is at a ground level, the low voltage +0 V is applied to the port B of the MCU 43.

The MCU selects one of the two EEPROMS 47 and 48 based on the signals input into the ports A and B. The EEPROM 47 stores digital display identification data, and the EEPROM 48 stores analog display identification data. The operation of each of the EEPROMS 47 and 48 is as follows.

When a DVI-A-type connector 411 is inserted into the DVI connector 412, only the C5-th pin of the DVI connector 412 is grounded so that a high voltage +Vcc and a low voltage +0 V are respectively applied to the ports A and B. The MCU 43 outputs a low signal to a port C to select the EEPROM 48 for the analog display identification data. The NOT gate 44 receives the low signal from the port C, turns off the IC2 buffer 45, and turns on the IC3 buffer 46. By supplying a power of +5 V to the EEPROM 48 for the analog display identification data, the analog display identification data stored in the EEPROM 48 may be output to a seventh pin of the DVI connector 412 via a DDC.

When a DVI-D-type connector 411 is inserted into the DVI connector 412, only the 22nd pin of the DVI connector 412 is grounded so that a low voltage +0 V and a high voltage +Vcc are input into the ports A and B, respectively, of the MCU 43. To select the EEPROM 47 for the digital display identification data, the MCU 43 outputs a high signal via the port C. The NOT gate 44 receives the high signal output from the port C, turns on the IC2 buffer 45, and turns off the IC3 buffer 46. By supplying a power of +5 V to the EEPROM 47 for the digital display identification data, the digital display identification data stored in the EEPROM 47 may be output to the seventh pin of the DVI connector 412 via the DDC.

When a DVI-I-type connector 411 is inserted into the DVI connector 412, the 22nd and C5-th pins of the DVI connector 412 are all grounded so that a low voltage +0 V and a high voltage +Vcc are input into the ports A and B, respectively, of the DVI connector 412. In the case of a PC supporting an OSD function, a user may directly select whether his or her monitor operates in an analog manner or a digital manner. In the case of a PC supporting an enhanced plug-and-play function, the user may select whether his or her monitor operates in an analog manner or a digital manner depending on the format of input image signals. After selecting the way a monitor operates by choosing between an analog manner or a digital manner, the MCU 43 outputs a high signal or a low signal to the port C to select the EEPROM 48 for the analog display identification data or the EEPROM 47 for the digital display identification data.

Figure 5:
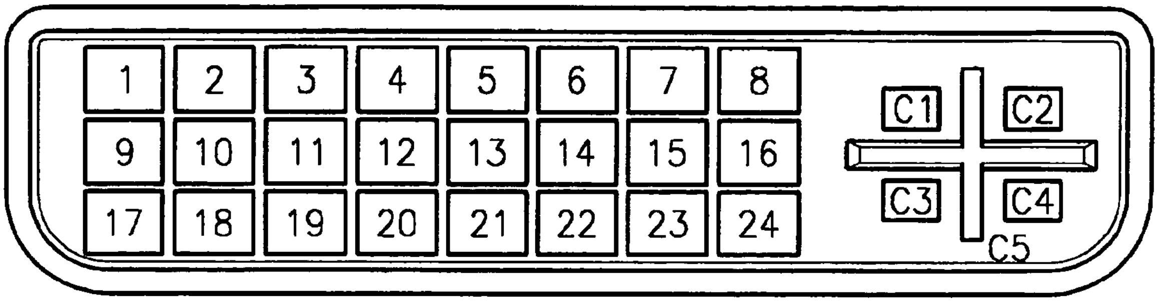
FIG. 5 is a plan view of a DVI-I-type connector.

FIG. 5 is a plan view of a DVI-I-type connector. Referring to FIG. 5, the DVI-I-type connector includes 29 pins arranged in three rows. Among the 29 pins, a DVI-I-type connector uses five pins C1 through C5 exclusively provided for analog signals and shared pins 6, 7, 8, 14, 15, and 16. A DVI-D-type connector uses all the 29 pins of the DVI-I-type connector except for the five pins C1 through C5 and one (8) of the shared pins, and thus transmits 23 different signals.

FIG. 6 is a diagram illustrating the arrangement of signals output from pins of a DVI-I-type connector. Referring to FIG. 6, first through fifth pins, ninth through thirteenth pins, and seventeenth through twenty first pins serve as channels to transmit digital image data and take advantage of transition minimized differential signaling (TDMS) as a digital transmission protocol. In both a DVI-I-type connector and a DVI-D-type connector, digital data transmission is carried out in a TMDS link zone. A single link has three data transmission channels Data 0, Data 1, and Data 2, and a dual link has two times as many data transmission channels (Data 0, Data 1, Data 2, Data 3, Data 4, and Data 5) as the single link. When the speed of receiving pixel data is not higher than 165 MHz, the single link is driven. Otherwise, the dual link is driven. In FIG. 6, 22, 23, and 24 represent pins through which TDMS clock data is transmitted.

C1 through C5 and 8 represent analog image data transmission channels. 6 and 7 represent pins through which DDC clocks and DDC data that support a plug-and-play function are transmitted. 14 represents a pin to control a power standby mode.

FIG. 7 is a logic calculation table to identify a DVI connector type. As described above with reference to FIG. 4, to select an EEPROM for IC4 analog data. An NOT gate receives the low signal from the port C, turns off an IC2 buffer, and turns on an IC3 buffer. By supplying a power of +5 V to the EEPROM for IC4 analog data, analog display identification data stored in the corresponding EEPROM may be output to a seventh pin of the DVI connector of the monitor via a DDC.

When a DVI-D-type connector is inserted into the DVI connector of the monitor, only the 22nd pin of the DVI connector of the monitor is grounded so that a low voltage and a high voltage are input into the ports A and B, respectively, of the MCU. To select an EEPROM for IC4 digital data, the MCU outputs a high signal to the port C. The NOT gate receives the high signal output from the port C, turns on the IC2 buffer, and turns off the IC3 buffer. By supplying a power of +5 V to the EEPROM for IC4 digital data, digital display identification data stored in the corresponding EEPROM may be output to the seventh pin of the DVI connector of the monitor via the DDC.

When a DVI-I-type connector is inserted into the DVI connector of the monitor, both the 22nd and C5-th pins of the DVI connector of the monitor are grounded so that a low voltage and a high voltage are input into the ports A and B, respectively, of the DVI connector of the monitor. When a PC supports an OSD function, a user may directly select whether his or her monitor operates in an analog manner or a digital manner. When a PC supports an enhanced plug-and-play function, the user may select whether his or her monitor operates in an analog manner or a digital manner depending on the format of input image signals. After the selection of whether a monitor operates in an analog manner or a digital manner, the MCU outputs a high signal or a low signal to the port C to select the EEPROM for IC4 digital data or the EEPROM for IC4 analog data.

Figure 8:
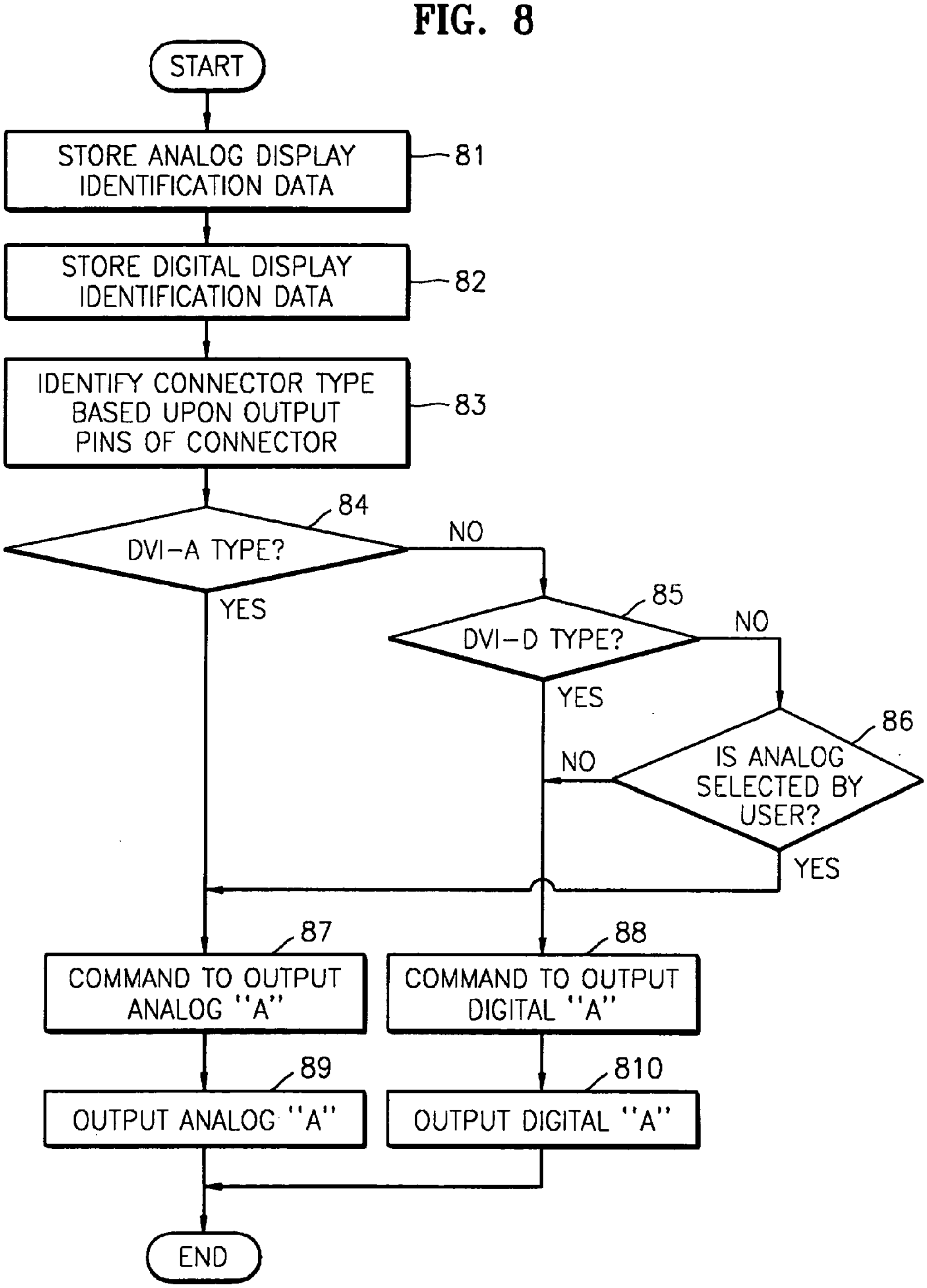
FIG. 8 is a flowchart of a method to output different display identification data depending on a connector type according to an embodiment of the present invention.

FIG. 8 is a flowchart of a method to output different display identification data depending on a connector type according to an embodiment of the present invention. Referring to FIG. 8, analog display identification data is stored in operation 81, and then digital display identification data is stored in operation 82. The analog display identification data and the digital display identification data have a predetermined structure according to EDID specifications suggested by the VESA. Thereafter, a connector type is identified in operation 83 based on the output of pins of the connector. Here, the connector is a DVI connector. In other words, it is verified, based upon the output of pins of the DVI connector, whether the DVI connector is a DVI-A-type connector, a DVI-D-type connector, or a DVI-I-type connector. More specifically, when the output of a 22nd pin (TDMS clock ground) of the DVI connector is at a high impedance level and the output of a C5-th pin (analog ground) of the DVI connector is at a ground level, the DVI connector is identified as a DVI-A-type connector. When the output of the 22nd pin (TDMS clock ground) of the DVI connector is at a ground level and the output of the C5-th pin (analog ground) of the DVI connector is at a high impedance level, the DVI connector is identified as a DVI-D-type connector. When the output of the 22nd pin (TDMS clock ground) of the DVI connector is at a ground level and the output of the C5-th pin (analog ground) of the DVI connector is also at a ground level, the DVI connector is identified as a DVI-I-type connector.

Thereafter, depending on the type of the DVI connector, a command to output the analog display identification data or the digital display identification data is issued. In other words, when the DVI connector is identified as a DVI-A-type connector in operation 84, a command to output the analog display identification data is issued in operation 87. When the DVI connector is identified as a DVI-D-type connector in operation 85, a command to output the digital display identification data is issued in operation 88. When the DVI connector is identified as a DVI-D-type connector in operation 86, a command to output either the analog or digital display identification data depending on predetermined additional information is issued in operations 87 and 88. The predetermined additional information indicates that either the analog display identification data or the digital display identification data is to be output according to a user's selection.

Thereafter, when a command to output the analog display identification data is issued, the analog display identification data is output in operation 89. On the other hand, when a command to output the digital display identification data is issued, the digital display identification data is output in operation 810.

Figure 9:
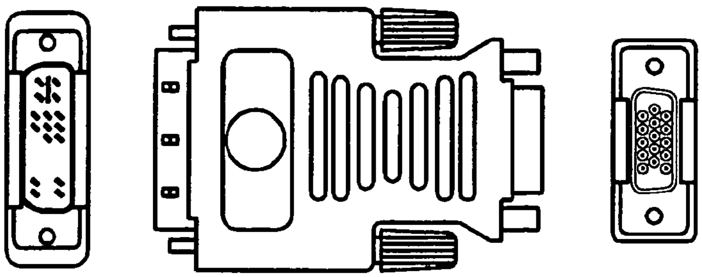
FIG. 9 is a diagram illustrating an example of a DVI-A-type connector.

FIG. 9 is a diagram illustrating an example of a DVI-A-type connector. FIG. 9 includes a front view, a rear view, and a plan view of an adaptor in which a DVI-A-type connector plug manufactured by MOLEX CORP., a company specializing in the manufacture of connectors, and a VGA socket are attached to each other.

Figure 10:
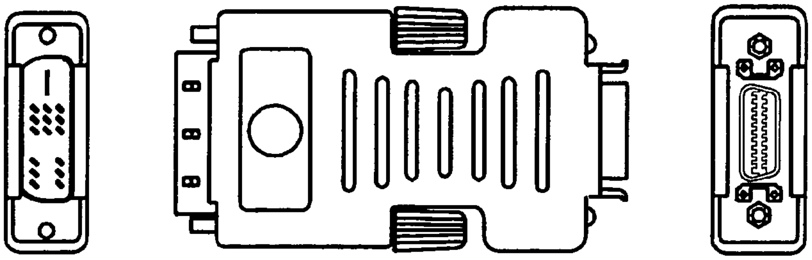
FIG. 10 is a diagram illustrating an example of a DVI-D-type connector.

FIG. 10 is a diagram illustrating an example of a DVI-D-type connector. FIG. 10 includes a front view, a rear view, and a plan view of an adaptor in which a DVI-D-type connector plug manufactured by Molex Corp.] MOLEX CORP., and a VGA socket are attached to each other.

Figure 11:
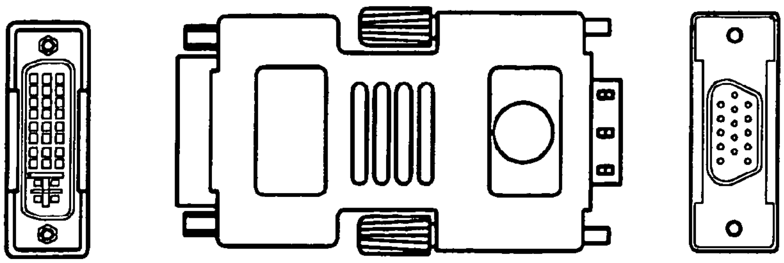
FIG. 11 is a diagram illustrating an example of a DVI-I-type connector.

FIG. 11 is a diagram illustrating an example of a DVI-I-type connector. FIG. 11 includes a front view, a rear view, and a plan view of an adaptor in which a DVI-I-type connector plug manufactured by Molex Corp.] MOLEX CORP., and a VGA socket are attached to each other.

As described above with reference to FIGS. 9, 10, and 11, DVI-A-type connectors are still manufactured because most systems currently being used in the field still adopt a pure analog manner, contrary to the DDWG standard specifications suggesting DVI-D-type and DVI-I-type connectors.

The aforementioned embodiments of the present invention may be written into a program which may be executed in a computer and may be realized in a common digital computer that may operate the program with the help of a computer-readable recording medium.

The computer-readable recording medium includes a magnetic storage medium, such as ROM, a floppy disk, or a hard disk, an optical recording medium, such as CD-ROM, or a DVD, and a carrier wave, such as data transmission through the Internet.

According to the present invention, a perfect plug-and-play function may automatically set up an optimum environment for a display device by identifying a DVI connector type as a DVI-A-type, DVI-D-type, or DVI-I-type connector based upon the manner data is transmitted between a system and a display device via a DVI connector and may transmit display identification data corresponding to the identified DVI connector type.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to output different display identification data depending on a connector type, comprising:

an analog display identification data storing and outputting unit which stores predetermined analog display identification data and outputs the stored analog display identification data to a predetermined system when a command to output the analog display identification data is issued;

a digital display identification data storing and outputting unit which stores predetermined digital display identification data and outputs the stored digital display identification data to the predetermined system when a command to output the analog display identification data is issued;

a connector type identification unit which identifies a connector type based upon an output of pins of a predetermined connector; and a display identification data output command unit which commands one of:

the analog display identification data storing and outputting unit, and the digital display identification data storing and outputting unit, to output one of:

the analog display identification data, and the digital display identification data, to the predetermined system based upon an identified connector type, wherein the predetermined connector is a DVI connector, and wherein the connector type identification unit identifies the DVI connector as one of a DVI-A-type, a DVI-D-type, and a DVI-l-type connector based on the output of pins of the DVI connector.

2. The apparatus of claim 1, wherein the analog display identification data and the digital display identification data have a predetermined structure according to extended display identification data (EDID) specifications of the Video Electronics Standards Association (VESA).

3. The apparatus of claim 1, wherein the connector type identification unit comprises:

a DVI-A-type identifier which identifies the DVI connector as a DVI-A-type connector when an output of a 22nd of the DVI connector of a Terminal Display Management System clock ground is at a high impedance and an output of a C5-th pin of the DVI connector of an analog ground is at a ground level;

a DVI-D-type identifier which identifies the DVI connector as a DVI-D-type connector when the output of the 22nd of the DVI connector of the Terminal Display Management System clock ground is at a ground level and the output of the C5-th pin of the DVI connector of the analog ground is at a high impedance level; and a DVI-l-type identifier which identifies the DVI connector as a DVI-l-type connector when the output of the 22nd of the DVI connector of the Terminal Display Management System clock ground and the output of the C5-th pin of the DVI connector of the analog ground are at a ground level.

4. The apparatus of claim 1, wherein the display identification data output command unit comprises:

an analog display identification data output commander which commands the analog display identification data storing and outputting unit to output the analog display identification data when the DVI connector is identified as a DVI-A-type connector by the connector type identification unit; and a digital display identification data output commander which commands the digital display identification data storing and outputting unit to output the digital display identification data when the DVI connector is identified as a DVI-D-type connector by the connector type identification unit.

5. The apparatus of claim 4, wherein the analog display identification data output commander commands the analog display identification data storing and outputting unit to output the analog display identification data according to predetermined additional information when the DVI connector is identified as a DVI-I-type connector by the connector type identification unit.

6. The apparatus of claim 5, wherein the additional information indicates that the analog display identification data is to be output according to a user selection.

7. The apparatus of claim 4, wherein the digital display identification data output commander commands the digital display identification data storing and outputting unit to output the digital display identification data according to predetermined additional information when the DVI connector is identified as a DVI-I-type connector by the connector type identification unit.

8. The apparatus of claim 7, wherein the predetermined additional information indicates that the digital display identification data is to be output according to a user selection.

9. A method to output different display identification data depending on a connector type, comprising:

storing predetermined analog display identification data;

storing predetermined digital display identification data;

identifying the connector type based upon an output of pins of a predetermined connector;

issuing a command to output one of the predetermined analog display identification data and the predetermined digital display identification data depending on the identified connector type;

outputting the stored predetermined analog display identification data in response to the command to output the stored predetermined analog display identification data; and outputting the stored predetermined digital display identification data in response to the command to output the stored predetermined digital display identification data, wherein the predetermined connector is a DVI connector, and wherein the identifying the connector type based upon the output of pins of the predetermined connector comprises identifying the DVI connector as one of a DVI-A-type, a DVI-D-type, and a DVI-I-type connector based on the output of pins of the DVI connector.

10. The method of claim 9, wherein the stored predetermined analog display identification data and the stored predetermined digital display identification data have a predetermined structure according to extended display identification data (EDID) specifications of the Video Electronics Standards Association (VESA).

11. The method of claim 9, wherein the identifying the connector type based upon the output of pins of the predetermined connector comprises:

identifying the DVI connector as a DVI-A-type connector when the output of a 22nd of the DVI connector of a Terminal Display Management System clock ground is at a high impedance and the output of a C5-th pin of the DVI connector of an analog ground is at a ground level;

identifying the DVI connector as a DVI-D-type connector when the output of the 22nd of the DVI connector of the Terminal Display Management System clock ground is at a ground level and the output of the C5-th pin of the DVI connector of the analog ground is at a high impedance level; and identifying the DVI connector as a DVI-I-type connector when the output of the 22nd of the DVI connector of the Terminal Display Management System clock ground and the output of the C5-th pin of the DVI connector of the analog ground are at a ground level.

12. The method of claim 9, wherein the issuing the command to output one of the predetermined analog display identification data and the predetermined digital display identification data depending on the identified connector type comprises:

issuing the command to output the analog display identification data when the DVI connector is identified as a DVI-A-type connector by the connector type identification unit; and issuing a command to output the digital display identification data when the DVI connector is identified as a DVI-D-type connector by the connector type identification unit.

13. The method of claim 12, wherein the issuing the command to output the analog display identification data when the DVI connector is identified as the DVI-A-type connector by the connector type identification unit comprises issuing the command to output the analog display identification data according to predetermined additional information when the DVI connector is identified as the DVI-I-type connector.

14. The method of claim 13, wherein the predetermined additional information indicates that the analog display identification data is to be output according to a user selection.

15. The method of claim 12, wherein the issuing the command to output the digital display identification data when the DVI connector is identified as a DVI-D-type connector by the connector type identification unit comprises issuing a command to output the digital display identification data according to predetermined additional information when the DVI connector is identified as the DVI-I-type connector.

16. The method of claim 15, wherein the additional information indicates that the digital display identification data is to be output according to a user selection.

17. A computer-readable recording medium having computer-executable instructions stored thereon, to output different display identification data depending on a connector type, the computer-executable instructions comprising:

storing predetermined analog display identification data;

storing predetermined digital display identification data;

identifying the connector type based upon an output of pins of a predetermined connector;

issuing a command to output one of the predetermined analog display identification data and the predetermined digital display identification data depending on an identified connector type;

outputting the stored predetermined analog display identification data in response to the command to output the stored predetermined analog display identification data; and outputting the stored predetermined digital display identification data in response to the command to output the stored predetermined digital display identification data, wherein the predetermined connector is a DVI connector, and wherein in identifying the connector type based upon the output of pins of the predetermined connector, the DVI connector is identified as one of a DVI-A-type, a DVI-D-type, and a DVI-I-type connector based on the output of pins of the DVI connector.

18. The computer-readable recording medium of claim 17, wherein the stored predetermined analog display identification data and the stored predetermined digital display identification data have a predetermined structure according to EDID specifications of the VESA.

19. The computer-readable recording medium of claim 17, wherein the identifying the connector type based upon the output of pins of the predetermined connector comprises:

identifying the DVI connector as a DVI-A-type connector when the output of a 22nd of the DVI connector of a Terminal Display Management System clock ground is at a high impedance and the output of a C5-th pin of the DVI connector of an analog ground is at a ground level;

identifying the DVI connector as a DVI-D-type connector when the output of the 22nd of the DVI connector of the Terminal Display Management System clock ground is at a ground level and the output of the C5-th pin of the DVI connector of the analog ground is at a high impedance level; and identifying the DVI connector as a DVI-I-type connector when the output of the 22nd of the DVI connector of the Terminal Display Management System clock ground and the output of the C5-th pin of the DVI connector of the analog ground are at a ground level.

20. The computer-readable recording medium of claim 17, wherein issuing a command to output one of the predetermined analog display identification data and the predetermined digital display identification data depending on the identified connector type comprises:

issuing a command to output the analog display identification data when the DVI connector is identified as the DVI-A-type connector by the connector type identification unit; and issuing a command to output the digital display identification data when the DVI connector is identified as the DVI-D-type connector by the connector type identification unit.

21. The computer-readable recording medium of claim 20, wherein in issuing a command to output the analog display identification data when the DVI connector is identified as a DVI-A-type connector by the connector type identification unit, a command to output the analog display identification data is issued according to predetermined additional information when the DVI connector is identified as the DVI-I-type connector.

22. The computer-readable recording medium of claim 21, wherein the predetermined additional information indicates that the analog display identification data is to be output according to a user selection.

23. The computer-readable recording medium of claim 20, wherein in issuing a command to output the digital display identification data when the DVI connector is identified as the DVI-D-type connector by the connector type identification unit, a command to output the digital display identification data is issued according to predetermined additional information when the DVI connector is identified as the DVI-I-type connector.

24. The computer-readable recording medium of claim 23, wherein the additional information indicates that the digital display identification data is to be output according to a user selection.

25. An apparatus to output different display identification data depending on a connector type, comprising:

a data storage unit to store analog display identification data and digital display identification data;

a connector type identification unit which identifies a connector type based upon an output of pins of a predetermined connector; and a display identification data output command unit which commands the data storage unit to output one of: the analog display identification data and the digital display identification data based upon the identified connector type, wherein the predetermined connector is a DVI connector, and wherein the connector type identification unit identifies the DVI connector as one of a DVI-A-type, a DVI-D-type, and a DVI-I-type connector based on the output of pins of the DVI connector.

26. The apparatus of claim 25, wherein the data storage unit comprises:

an analog display identification data storing and outputting unit which stores predetermined analog display identification data and outputs the stored analog display identification data to a predetermined system when a command to output the analog display identification data is issued; and a digital display identification data storing and outputting unit which stores predetermined digital display identification data and outputs the stored digital display identification data to the predetermined system when a command to output the analog display identification data is issued.

27. The apparatus of claim 25, wherein the analog display identification data and the digital display identification data have a predetermined structure according to EDID specifications of the VESA.

28. The apparatus of claim 25, wherein the connector type identification unit comprises:

a DVI-A-type identifier which identifies the DVI connector as a DVI-A-type connector when an output of a 22nd of the DVI connector of a Terminal Display Management System clock ground is at a high impedance and an output of a C5-th pin of the DVI connector of an analog ground is at a ground level;

a DVI-D-type identifier which identifies the DVI connector as a DVI-D-type connector when the output of the 22nd of the DVI connector of the Terminal Display Management System clock ground is at a ground level and the output of the C5-th pin of the DVI connector of the analog ground is at a high impedance level; and a DVI-I-type identifier which identifies the DVI connector as a DVI-I-type connector when the output of the 22nd of the DVI connector of the Terminal Display Management System clock ground and the output of the C5-th pin of the DVI connector of the analog ground are at a ground level.

29. The apparatus of claim 25, wherein the display identification data output command unit comprises:

an analog display identification data output commander which commands the analog display identification data storing and outputting unit to output the analog display identification data when the DVI connector is identified as the DVI-A-type connector by the connector type identification unit; and a digital display identification data output commander which commands the digital display identification data storing and outputting unit to output the digital display identification data when the DVI connector is identified as the DVI-D-type connector by the connector type identification unit.

30. The apparatus of claim 29, wherein the analog display identification data output commander commands the analog display identification data storing and outputting unit to output the analog display identification data according to predetermined additional information when the DVI connector is identified as the DVI-I-type connector by the connector type identification unit.

31. The apparatus of claim 30, wherein the additional information indicates that the analog display identification data is to be output according to a user selection.

32. The apparatus of claim 29, wherein the digital display identification data output commander commands the digital display identification data storing and outputting unit to output the digital display identification data according to predetermined additional information when the DVI connector is identified as the DVI-I-type connector by the connector type identification unit.

33. The apparatus of claim 32, wherein the predetermined additional information indicates that the digital display identification data is to be output according to a user selection.

* * * * *

UNITED STATES PATENT AND TRADEMARK OFFICE

CERTIFICATE OF CORRECTION

PATENT NO. : 7,295,194 B2
APPLICATION NO. : 10/680420
DATED : November 13, 2007
INVENTOR(S) : Kyung-shik Lee It is certified that error appears in the above-identified patent and that said Letters Patent is hereby corrected as shown below:

Column 9, Line 54, change “DVI-1-type” to --DVI-I-type--.

Column 10, Line 9, change “DVI-1-type” to --DVI-I-type--.

Column 10, Line 10, change “DVI-1-type” to --DVI-I-type--.

Signed and Sealed this

Sixth Day of May, 2008

JON W. DUDAS
*Director of the United States Patent and Trademark Office*